Oct. 19, 1937.   H. R. FYKE   2,096,034
PRESSURE SYSTEM
Filed July 30, 1936
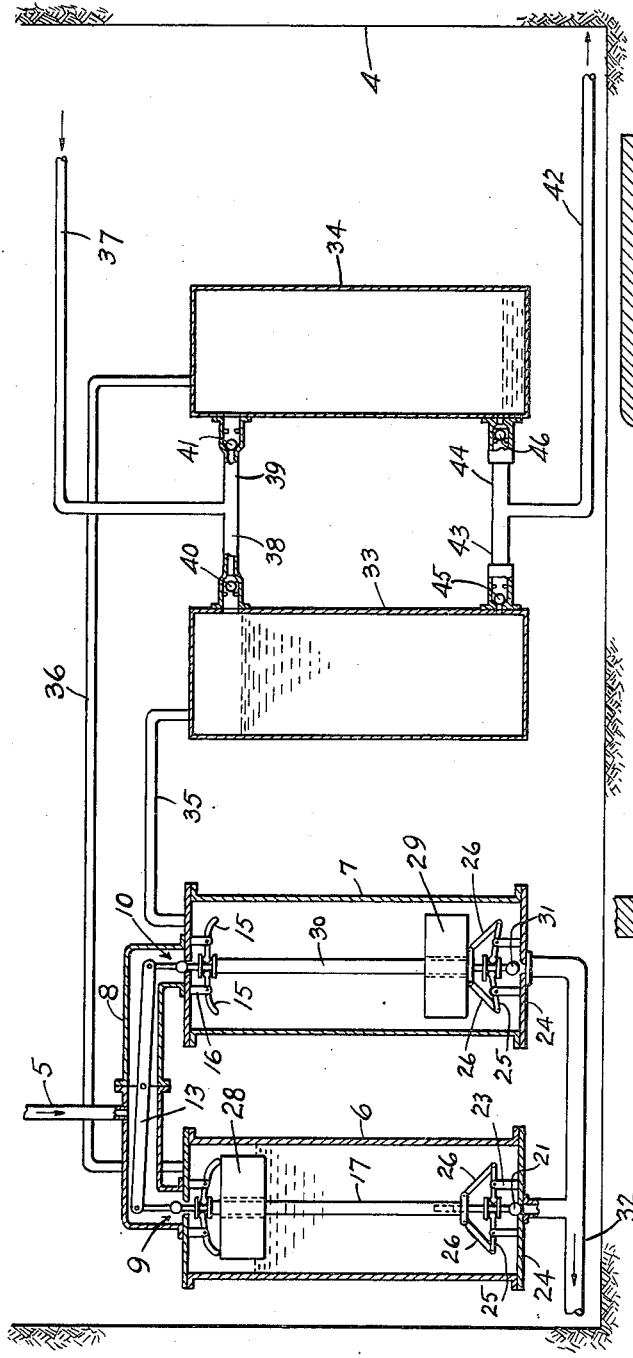
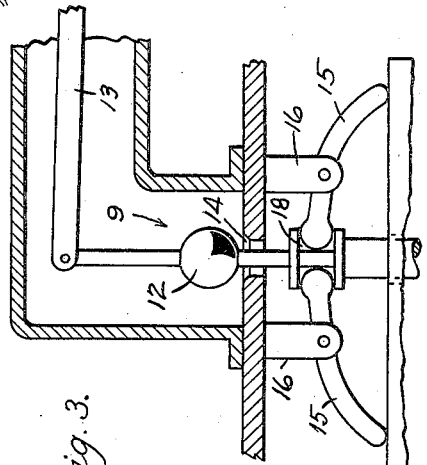
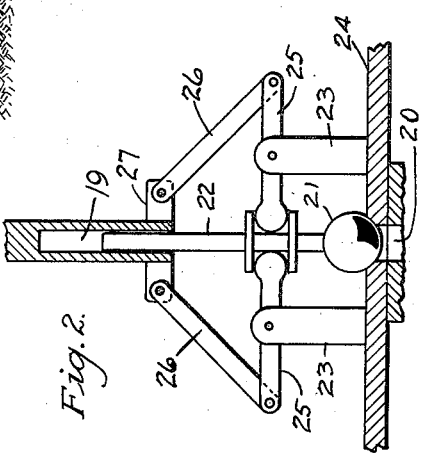
INVENTOR.
Homer R. Fyke
BY Carlos G. Stratton
ATTORNEY.

Patented Oct. 19, 1937

2,096,034

UNITED STATES PATENT OFFICE 2,096,034

PRESSURE SYSTEM

Homer R. Fyke, Los Angeles, Calif., assignor of one-half to Thomas O. Haynes, Laguna Beach, Calif.

Application July 30, 1936, Serial No. 93,380

7 Claims. (Cl. 230—91)

My invention relates to pressure systems, and more particularly to means for converting fluid pressure into pressure upon another fluid medium or upon another body of the same or a similar fluid.

The system may be operated conjunctively with the apparatus shown and described in my co-pending application, Serial No. 93,379, filed contemporaneously herewith.

An important object of my invention is to transfer the pressure of a water supply to a confined liquid body having a lower freezing point.

Another object is to exert continuous pressure through the intermediary of a confined body of liquid.

Still another object is to provide an apparatus that may be buried below the freezing line in the ground, whereby water pressure may be converted to pressure upon a non-freezing fluid, for use during winter seasons.

The invention also comprises novel details of construction and novel combinations and arrangements of parts, which will more fully appear in the course of the following description.

In the drawing, like reference characters designate similar parts in the several views.

Figure 1 is a vertical section of a system embodying my invention.

Figures 2 and 3 are enlarged elevations, partly in section, showing details of the system.

Referring more in detail to the drawing, the reference number 4 generally designates a pit in the ground, in which is housed an embodiment of my invention. An inlet conduit 5 supplies pressure fluid to the system; e. g., water under pressure.

Two tanks 6 and 7 are arranged to alternately receive the supply from the conduit 5. A header 8 distributes the water supply from the conduit to the tanks. Valves 9 and 10 respectively control the flow to tank 6 and to the tank 7. The valves comprise balls 12 depending from opposite ends of a walking beam 13. Each ball is arranged to engage a seat 14.

Levers 15 are pivotally mounted on lugs 16 within the tanks. Rods 17 and 30, depending from the balls 12 in the tanks 6 and 7 respectively, have circumferential grooves 18 for receiving ends of the levers 15. The lower ends of the rods 17 and 30 have sockets 19.

Each of the tanks 6 and 7 has a bottom outlet 20. Ball valves 21 and 31 are arranged to control the outlets of tanks 6 and 7 respectively. Bars 22, mounted on the balls 21 and 31, have sliding fits with the sockets 19. Lugs 23 on the bottoms 24 of said tanks pivotally carry levers 25, which in turn carry links 26. The links 26 are not only pivoted on the levers 25, but also on cross bars 27 adjacent the lower ends of the rods 17 and 30.

Slidably mounted on the rods 17 and 30 are floats 28 and 29, in the tanks 6 and 7 respectively. A discharge conduit 32 receives the liquid discharged at the outlets 20 of the tanks 6 and 7.

Another pair of tanks 33 and 34 are comprised in the system. The tanks 7 and 33 are connected at their heads by a pipe 35 and the tanks 6 and 34 are connected at their heads by a pipe 36.

A pressure exhaust pipe 37 is connected by branches 38 and 39 to the upper portions of the tanks 33 and 34 respectively. Ball check valves 40 and 41 are disposed in the branches 38 and 39 respectively. Each check is arranged to permit the flow of pressure fluid into the tanks 33 and 34, but to prevent the escape of pressure fluid at such points.

A pressure discharge pipe 42 is connected by branches 43 and 44 to the lower portions of the tanks 33 and 34 respectively. Ball check valves 45 and 46 are disposed in the branches 43 and 44 respectively. Each check is arranged to permit the exhaust of fluid pressure from the tanks 33 and 34, but to prevent the intake of pressure fluid at such points. The tanks alternately receive and discharge portions of a body of fluid that is preferably a liquid having a lower freezing point; e. g., glycerine, alcohol or a liquid composition containing one or both of same.

In the use of the present system, the conduit 5 is preferably connected in an ordinary water supply system that is under pressure, and the discharge conduit is connected with a reservoir, a waste disposal, a sewer, or the like.

The pipes 37 and 42 may be connected respectively with the exhaust and intake of any apparatus employing fluid pressure; e. g., the apparatus shown and described in my said co-pending application for patent.

In the operation of the present system, liquid pressure is introduced into the header 8. In the position shown in Figure 1, the valve 9 is open and the valve 21 is closed, and the tank 6 is almost filled with liquid, causing the float 28 to rise almost to the upper limit of its movement. Figure 1 shows the position of the float 28 just as it strikes the levers operating the valve 9. Additional liquid fed into the tank 6 will cause the float to rise until it closes the valve 9. Filling of the tank 6 with liquid expels air therefrom, through the pipe 36 into the tank 34. This movement of air increases the air pressure in the tank 34. Closing of the valve 9 forces the rod 17 downward, which opens the valve 21, for the discharge of the liquid from the tank 6 into the outlet conduit 32. Of course the float 28 descends and rests on the cross bars 27, as shown by the float 29 in tank 7.

As soon as the float 28 closes the valve 9, the valve 10 is caused to open through the intermediary of the walking beam 13, and the valve 31 is caused to close since the rod 30 is lifted by the walking beam and the greater weight of the ball valve 31 causes it to drop closed.

Thereupon liquid from the conduit 5 empties into the tank 7, causing the float 29 to rise until it strikes the levers 15 operating the valve 10. Air pressure in the tank 7, caused by the rising liquid, is forced from the tank 7 through the pipe 35 into the tank 33.

When the float 29 closes the valve 10, opening the valve 31, liquid in the tank 7 is discharged into the outlet pipe 32. At the same time the valve 9 is open and the valve 21 closed, and the cycle of operation of the tanks 6 and 7 is being repeated.

Increase of air pressure in the tank 33 causes expulsion of fluid from said tank past the check valve 45, through the branch 43 and through the discharge pipe 42. The pressure in the branch 44 from the tank 33 holds the check 46 in a closed position. Spent fluid from the apparatus 30 that is being actuated by the fluid pressure is returned through the pipe 37, through branch 39, past check 41 and into the tank 34. The spent fluid goes into the tank 34 because the pressure therein is less than in the tank 33 (the pressure in the tank 33 holds the check 40 in a closed position). It is to be understood that the apparatus 50 may be of any desired type utilizing fluid pressure and may be situated where desired.

When the pressure in the tank 33 falls below the pressure in the tank 34, the pressure in the tank 34 opens the check 46 and closes the checks 41 and 45. Thereupon the pressure builds up again in the tank 33 by means of the pressure introduced by the pipe 35. At the same time, the fluid pressure in the tank 34 is discharging past the check 46, through the branch 44 and through the discharge 42 to perform its work. Spent fluid is returned through the pipe 37 to the tank 33, and then the cycle of operation of the tanks 33 and 34 is repeated.

It will be noted that a continuous flow of fluid pressure is being discharged through the pipe 42 by the system shown and described herein.

While I have illustrated and described what I now regard as the preferred embodiment of my invention, the construction is, of course, subject to modifications without departing from the spirit of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. A pressure system of the class referred to herein, comprising a tank having an inlet and an outlet, valves controlling the inlet and the outlet, levers operating the valves, a rod connecting with lever means operating one of the valves, link means connected with the lever means on the other valve and pivotally connected with said rod, the link means and the last-mentioned lever means being arranged to operate their respective valve oppositely to the other valve, whereby one valve will be open when the other is closed, a float in the tank arranged to actuate the lever means by the change of the level of liquid in the tank, means for supplying pressure liquid to the inlet, and means for receiving liquid discharged at the outlet, the tank having an exhaust and intake for air.

2. A pressure system of the class referred to herein, comprising a tank having an inlet and an outlet, valves controlling the inlet and the outlet, levers operating the valves, telescoping rods respectively connecting with the levers at the inlet and at the outlet, links connecting the levers on one valve with the rod that is connected with the other valve, a float connected to operate the latter rod by the change of the level of liquid in the tank, the levers that are connected with the links being fulcrumed to open or close their valve opposite to the operation of the other valve, means for supplying pressure liquid to the inlet, and means for receiving liquid discharged at the outlet, the tank having an exhaust and intake for air.

3. A pressure system of the class referred to herein, comprising a tank adapted for the admission of liquid under pressure, valves controlling the admission and discharge of pressure liquid to and from the tank, and the tank having port means for the admission and discharge of gas, a rod connecting with one of the valves, pivotally mounted means connecting with the rod and with the other valve to move one valve to an open position as the other valve moves to a closed position, and a float in the tank arranged to rise and fall relative to the rod and being arranged in one position to open one valve and thereby close the other valve and to close the former valve and thereby open the latter in another position.

4. A pressure system of the class referred to herein, comprising a pair of tanks adapted for the admission of liquid under pressure, a header for delivering liquid under pressure to the tanks selectively, each tank having port means for the admission and discharge of gas compressed by the liquid pressure, valves respectively controlling the admission and discharge of pressure liquid to and from each tank, a rod connecting admission and discharge valves of each tank for concerted action of the valves in each tank, floats in the tanks arranged to rise and fall relative to the rods, and means arranged to be struck by the floats and connected to actuate the rods when struck by the floats, to open and close said valves.

5. A pressure system of the class referred to herein, comprising a pair of tanks, a header for delivering liquid under pressure to the tanks selectively, each tank having port means for the admission and discharge of gas, valves respectively controlling the admission and discharge of pressure liquid to and from each tank, levers operating said valves, and floats in the tanks arranged to rise and fall by a change of liquid level therein, the levers being arranged to be struck by the floats upon the rise or fall thereof.

6. The pressure system according to claim 5, in which the valves for each tank are connected for conjunctive operation, and the floats are movable in the tanks relative to the means connecting the valves.

7. A pressure system of the class referred to herein, comprising a tank having port means for the admission and discharge of gas pressure, valves controlling the admission and discharge of pressure liquid to and from the tank, a rod having telescoping members connecting with the valves respectively, lever means connected to operate one of said members, lever means connecting the two members and arranged for moving the valves toward and away from each other for the admission and discharge of pressure liquid, and a float in the tank arranged to actuate the levers by its rise and fall.

HOMER R. FYKE.